United States Patent
Kato

(10) Patent No.: US 6,738,103 B2
(45) Date of Patent: May 18, 2004

(54) RECEIVER FOR DIGITAL BROADCASTING

(75) Inventor: Sei Kato, Saitama (JP)

(73) Assignee: Pioneer Corporation, Tokyo (JP)

( * ) Notice: Subject to any disclaimer, the term of this patent is extended or adjusted under 35 U.S.C. 154(b) by 544 days.

(21) Appl. No.: 09/880,929

(22) Filed: Jun. 15, 2001

(65) Prior Publication Data
US 2001/0053189 A1 Dec. 20, 2001

(30) Foreign Application Priority Data

Jun. 16, 2000 (JP) ........................................ 2000-180921

(51) Int. Cl.[7] .............................. H04N 5/44; H04B 7/02; H04L 1/02
(52) U.S. Cl. ......................... 348/725; 375/260; 375/267
(58) Field of Search ................................. 348/725, 726, 348/731, 553; 375/260, 267, 346, 347; H04N 5/44

(56) References Cited

U.S. PATENT DOCUMENTS

| | | | | |
|---|---|---|---|---|
| 5,636,242 A | * | 6/1997 | Tsujimoto | .................... 375/130 |
| 6,310,907 B1 | * | 10/2001 | Tsujimoto | .................... 375/141 |
| 6,330,036 B1 | * | 12/2001 | Murakami et al. | .......... 348/555 |
| 6,353,637 B1 | * | 3/2002 | Mansour et al. | ............. 375/260 |
| 6,430,401 B1 | * | 8/2002 | Lou et al. | .................... 455/108 |

* cited by examiner

*Primary Examiner*—Michael H. Lee
(74) *Attorney, Agent, or Firm*—Morgan, Lewis & Bockius LLP

(57) ABSTRACT

A receiver for digital broadcasting is provided that simultaneously receives a plurality of broadcast waves. When the receiver is powered on, a digital broadcast wave of a ground wave system having the smallest amount of interleaving that has been performed on transmission data is selected for reproduction. If the reception state of the above broadcast wave is not good or when a prescribed time has elapsed from the time the receiver is powered-on, a switch is made to a broadcast wave of the reception system that was selected when the power was last turned off.

48 Claims, 5 Drawing Sheets

RECEIVER FOR DIGITAL BROADCASTING

This application claims the benefit of Japanese Patent Application No. 2000-180921, filed on Jun. 16, 2000, which is hereby incorporated by reference.

BACKGROUND OF THE INVENTION

1. Field of the Invention

The present invention relates to a receiver for digital broadcasting, and more particularly, to a receiver capable of simultaneously receiving a plurality of digital broadcast waves.

2. Description of the Related Art

Generally, when data is transmitted in a digital broadcasting system, the sending side encodes data for transmission with an error-correcting code, such as a Reed-Solomon code or a Trellis code, before the data is transmitted. By encoding data intended for digital broadcast transmission with an error correcting code, a receiver can perform error correction on the received data in events when errors occur during the transmission process. One type of error that often occurs is a random error. A random error is a loss of data within the data transmission stream of relatively short period. Random errors are usually caused by radio interference, such as atmospheric noise and/or when a signal fades.

However, relatively long periods of data loss called burst error also occur often within a transmitted data stream. When burst errors occur, it is often difficult for a receiver to perform error correction because the number of data bits lost may exceed the redundancy of an error-correcting code.

Data interleaving is one measure that has been proposed for digital broadcasting to reduce the occurrence of data loss due to burst error. FIG. 1 schematically illustrates a data interleaving process that may be performed by the transmitting and receiving ends in a digital broadcast system. As shown in FIG. 1, an original data sequence 1 intended for reproduction includes a data sequence b0–b9 of a program. Before transmitting the data sequence 1 of the original program, the sending side changes the order of a data sequence according to a prescribed procedure (interleaving) to produce an interleaved data sequence 2. After receiving the data sequence 2, the reception side changes the order of the data sequence according to an opposite procedure (de-interleaving) so that the data is rearranged back into the order of the original data sequence 1.

Data sequence 3 illustrates a case when a burst error occurs during the transmission data sequence 2, resulting in a loss of a relatively long continuous period of data 3a–3c (respectively representing the loss of interleaved data b1, b4 and b7). However, a de-interleaving procedure performed on the reception side of the system distributes this continuous data loss portion 3a–3c over an entire data sequence, as shown by data sequence 4. In other words, the reception side can process a burst error consisting of a long period of data loss into several relatively short periods of data loss, i.e., the reception side's de-interleaving converts the burst error 3a–3c into random errors 3A, 3B and 3C, as shown in data sequence 4. Thereafter, since the burst error 3a–3c is distributed as a plurality of short duration random errors, error-correction may be properly performed on the data sequence 4 by using error-correcting codes to restore the lost data to its original state (e.g., data sequence 1) shown by data sequence 5 for program reproduction.

The extent to which transmission data is interleaved correlates with ability for correction of errors that occur during transmission. By increasing the degree that the order of a transmission data sequence is changed, longer periods of burst error in the transmission data sequence may be processed for correction by an error-correcting procedure on the receiving end.

However, the reception side can perform de-interleaving only after receiving all of an interleaved data sequence. Consequently, when the amount of interleaving performed on transmission data is made larger, a corresponding delay increases between of a start of an actual program output as video and/or audio and the reception of the digital broadcast transmission data.

Thus, there remains a need in the art for a receiver for digital broadcasting that enables adequate error correction in a plurality of transmitted program data of a digital broadcast waves while allowing for minimal delay between reception of the waves and reproduction of the transmitted program.

SUMMARY OF THE INVENTION

Accordingly, the present invention is directed to a receiver for digital broadcasting that substantially obviates one or more of the problems due to limitations and disadvantages of the related art.

One aspect of the present invention is a receiver for digital broadcasting that can produce a reproduction output of a broadcast content early after a start of reception.

Another aspect of the present invention is a receiver for digital broadcasting that includes a plurality of receiving systems for respectively receiving a plurality of broadcast signals, and the receiver includes a memory that stores information relating to selection of at least one receiving system of the plurality of receiving systems in accordance with a reception state of the at least one receiving system.

Still another aspect of the present invention is a receiver for digital broadcasting that is capable of simultaneously receiving a plurality digital broadcasts waves carrying digital data that are different in the amount of interleaving performed on the digital data within each wave prior to transmission.

In yet another aspect of the present invention, a receiver of digital broadcasting initially selects a digital broadcast wave among a plurality of received digital broadcast waves when a receiving operation is initiated, and the selected broadcast wave includes data that are not interleaved or have a relatively small amount of data interleaving among the plurality of digital broadcast waves.

In the present invention, when a plurality digital broadcast waves are of the same program, a user can experience a broadcast of a desired channel in a short time after the start of reception of the digital broadcast waves by the receiver. Therefore, the invention makes it possible to provide broadcast information quickly to a user, regardless of whether or not interleaving is performed on transmitted data received by each receiving system of the receiver and regardless whether the amounts of interleaving are different between the plurality of receiving systems of the receiver.

Additional aspects and advantages of the invention will be set forth in part in the description that follows, and in part will be obvious from the description, or may be learned by practice of the invention. The aspects and advantages of the invention will be realized and attained by means of the elements and combinations particularly pointed out in the appended claims. It is to be understood that both the foregoing general description and the following detailed description are exemplary and explanatory only and are intended to provide further explanation of the invention, as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention. In the drawings.

DESCRIPTION OF THE PREFERRED EMBODIMENT

Reference will now be made in detail to the preferred embodiments of the invention, examples of which are illustrated in the accompanying drawings. Whenever possible, the same reference numbers will be used throughout the drawings to refer to the same or like parts.

Recent attention is being paid to constructing a multi-band digital broadcasting system to reduce reception blind spots or to take other measures against electric wave failure due to multi-path waves or the like. In this system, the same program is broadcasted by transmitting a plurality of electromagnetic waves of different bands in a frequency band. For example, a plurality of satellite and/or terrestrial broadcasting waves may each broadcast at one of the plurality of bands.

Figure 1:
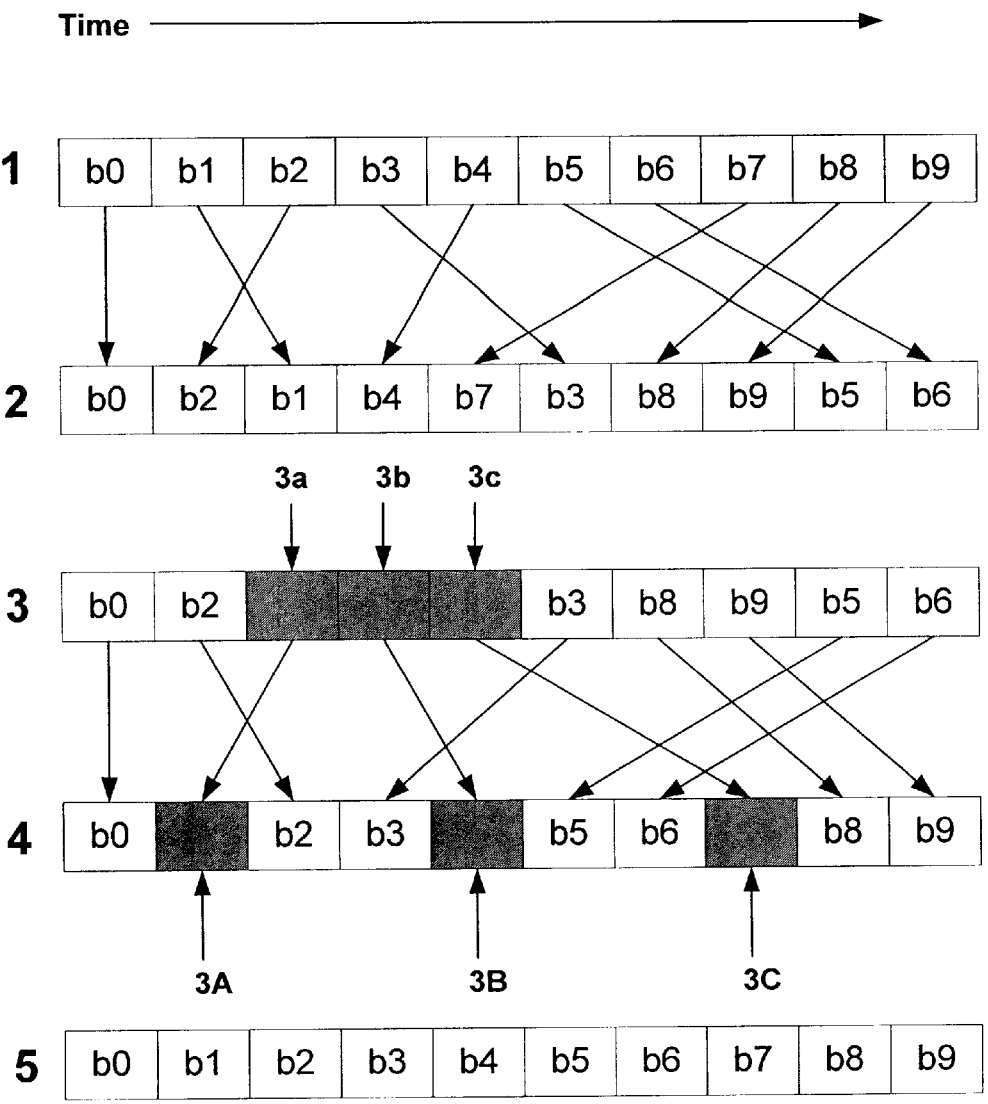
FIG. 1 provides a schematic of an illustrative a time chart showing interleaving and de-interleaving on transmission data of digital broadcasting.
Figure 2:
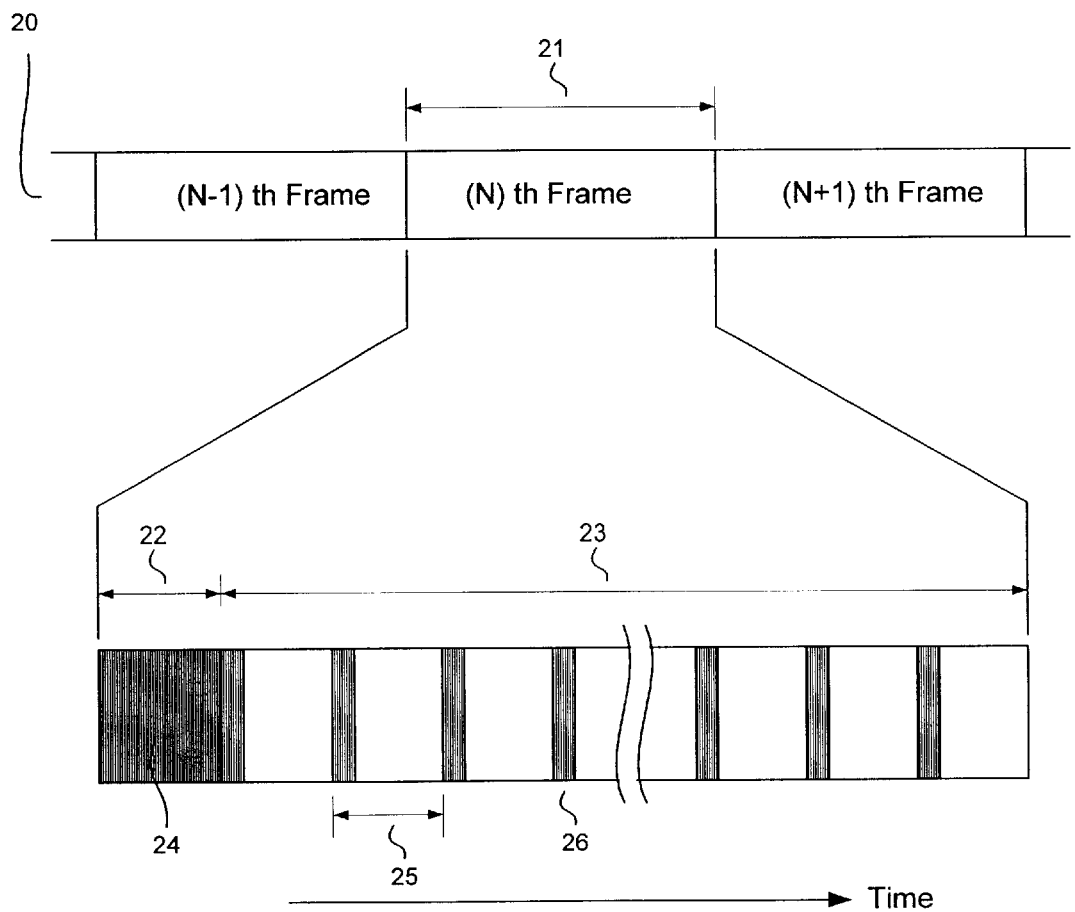
FIG. 2 provides a schematic of an illustrative time chart showing a transmission data format used in a digital broadcast wave.

In digital broadcasting, the data to be broadcast may be transmitted as a plurality of consecutive frames. FIG. 2 shows a sequential frame structure 20 of an exemplary transmission format that may be used in transmitting digital data.

As shown in FIG. 2, data to be transmitted is divided into a plurality of sequential frames 21. In particular, transmission of the data may be carried out in a unit of one frame 21. One frame 21 is mainly composed of a synchronization signal 22 and a data signal 23. The synchronization signal is composed of, for example, one synchronization symbol 24 indicating a start of the frame. The data signal is composed of, for example, numerous data symbols 25. Each of the data symbols 25 is such that data of a digitized picture, sound, or the like that is intended for broadcast may be subjected to digital modulation, such as Orthogonal Frequency Division Multiplex (OFDM), for example.

A region provided at the head of each of the data symbols, a so-called guard interval 26, is provided to prevent interference between symbols caused by multi-path waves or the like. The guard interval is excluded from data time series after demodulation by the setting of the time window at the time of data demodulation.

On the other hand, a receiver receives the digital broadcasting signal. After demodulating a received signal, a receiver decodes this signal into data. At this time, it is necessary that the receiver detect the start of a frame as a transmission unit of data. In such processing system, a synchronization signal may be used by the receiver for detecting the start of a frame.

A digital broadcasting system that broadcasts the same program using plural broadcast waves in different frequency bands may include a plurality of satellite broadcast waves. In such systems, broadcast waves are associated with respective radio propagation states. Digital broadcast waves may be different in the condition in which they are transmitted, such as whether or not interleaving is performed on transmission data and/or the amount of interleaving performed on transmission data. The differences may depend on various factors, such as the type of broadcast element (i.e., satellite versus terrestrial), signal power, environmental conditions, the position of the transmitter and/or receiver, and/or other factors. Generally, the amount of interleaving that is performed on transmission data is set by considering a data propagation state in a frequency band being used.

In the following description, a digital broadcasting system is assumed in which three broadcast waves, one terrestrial (ground) wave and two satellite broadcast waves that broadcast a program of the same content (video, audio, text, or the like), are transmitted. The three digital broadcast waves are given different frequency bands. However, this is just an example of digital broadcasting systems using plural broadcast waves that may be used with the present invention. For example, the number of broadcast waves may be more or less than three, and the number of satellite-broadcast waves, as well as the ground waves that make up the total number of waves used in a digital program transmission, also may vary.

Figure 3:
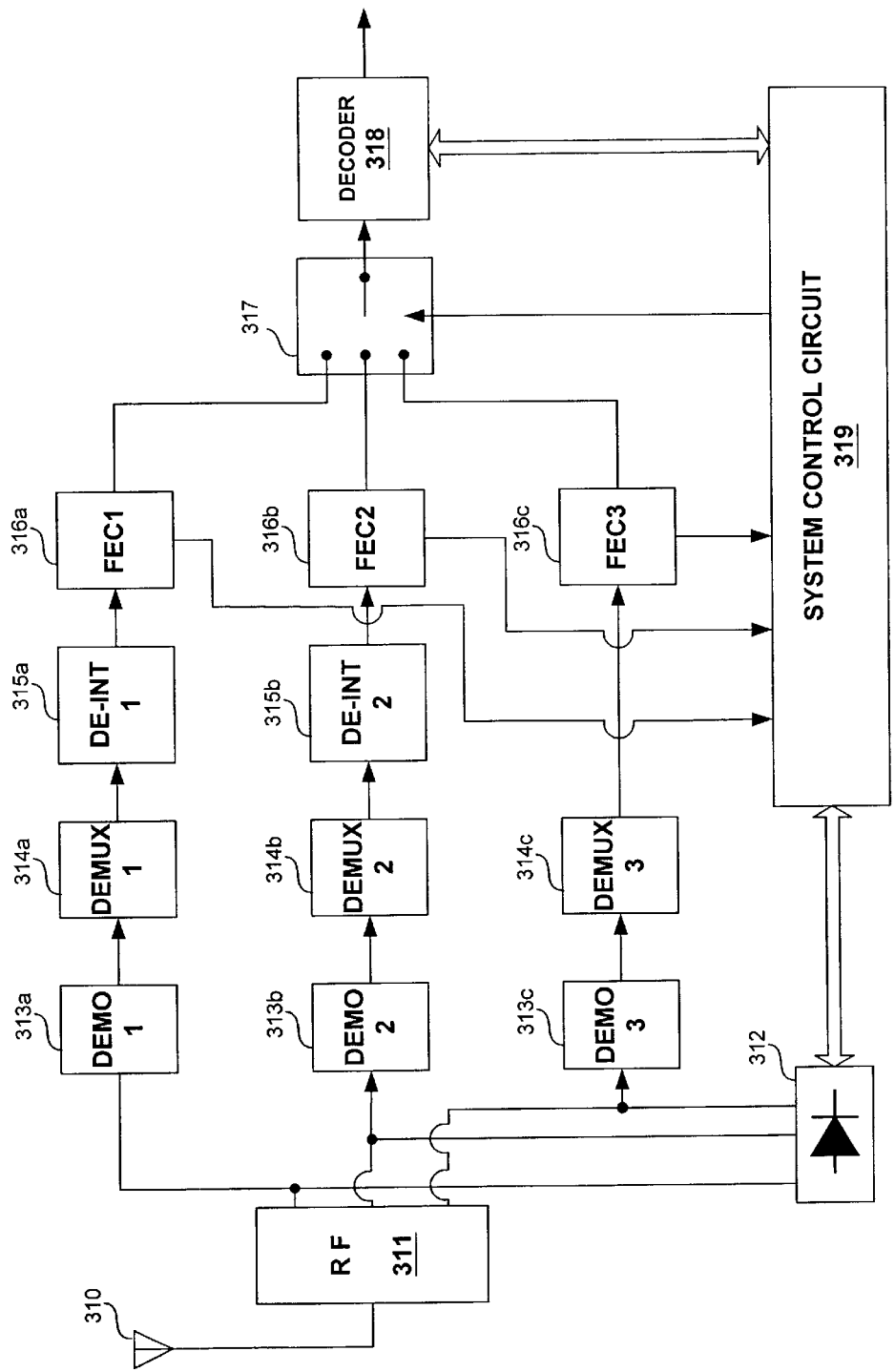
FIG. 3 provides a schematic of an illustrative configuration of a receiver for digital broadcasting according to an exemplary embodiment of the present invention.

FIG. 3 is a block diagram showing the configuration of an exemplary receiver for digital broadcasting according to the present invention. In this embodiment, circuits 313a, 314a, 315a and 316a are associated with one reception system of the receiver and process one digital broadcast wave, for example, a satellite broadcast wave. Similarly, circuits 313b, 314b, 315b and 316b are associated with another system and process another digital broadcast wave, such as another satellite broadcast wave. Further, circuits 313c, 314c and 316c are associated with yet another system that processes a third digital broadcast wave, such as, for example, a ground broadcast wave.

In this type of digital broadcasting system that includes a plurality of reception systems (described below in more detail), a receiver can switch between reception systems in accordance with reception states of the respective broadcast bands of the broadcast waves.

When each of the plurality of broadcast bands broadcast the same program data, each of the plurality of broadcast bands may be assigned to a same channel number of the receiver. As long as a reproduction channel of a receiver remains the same, switching between the broadcast waves does not affect the user experience (i.e., viewing and/or listening) of the broadcasted program.

In FIG. 3, a reception antenna 310 receives radio waves that are sent from respective digital broadcasting stations. The reception antenna 310 may be a small antenna, such as a rod antenna or a planar antenna.

A high-frequency circuit 311 includes circuitry for processing high-frequency signals (RF signals) that are supplied form the antenna 310 and performs processing, such as amplification and frequency conversion, in what is called the front end of a receiver. The received high-frequency signals from the three transmitting station are converted by the high-frequency circuit 311 into corresponding intermediate frequency signals (IF signals), which then are supplied to respective signal demodulation circuits 313a, 313b, and 313c.

Each of the demodulation circuits 313a–313c includes circuitry for demodulating a respective one of the plurality of digital broadcast waves and outputting data sequences carried by the broadcast wave. For example, OFDM may be used as the modulation signal format of one or more of the broadcast waves.

Each of the de-interleave circuits 314a–314c includes circuitry for de-interleaving a data sequence of one frame. The outputs of circuits 314a and 314b are respectively provided with additional de-interleave circuits 315a and 315b for de-interleaving data sequences that include several frames.

Each of error correction circuits 316a–316c performs error correction on a de-interleaved data sequence output by respective de-interleave circuits 315a, 315b and 314c. At the same time, each of the error correction circuits 316a–316c detects an error rate of the reception data and supplies the detected error rate to a system control circuit 319.

A selector 317 selects an arbitrary one of the reception data sequences and outputs the selected data sequence. The selector 317 is controlled based on instruction from the system control circuit 319.

A decoder 318 is a circuit for decoding data that is supplied from the selector 317. Various decoded signals such as video, audio, and the like are supplied to an output circuit (not shown) that is disposed downstream from the decoder 318.

A reception level detection circuit 312 is a circuit for detecting reception levels of the respective digital broadcast waves, judging whether the detected reception states are good or bad, and supplying the judgment results to the system control circuit 319.

The system control circuit 319 is a circuit for controlling the operation of the entire apparatus in a unified manner and is mainly formed by a microcomputer. The system control circuit 319 includes storage devices (not shown), such as a RAM (random access memory) and a ROM (read-only memory). The ROM stores a main routine for controlling the operation of the receiver as well as programs of various subroutines. The RAM temporarily stores a processing result of each routine.

Next, the operation of the receiver of the present invention is described. The receiver may operate in one of first and second operation modes.

Figures 4A, 4B:
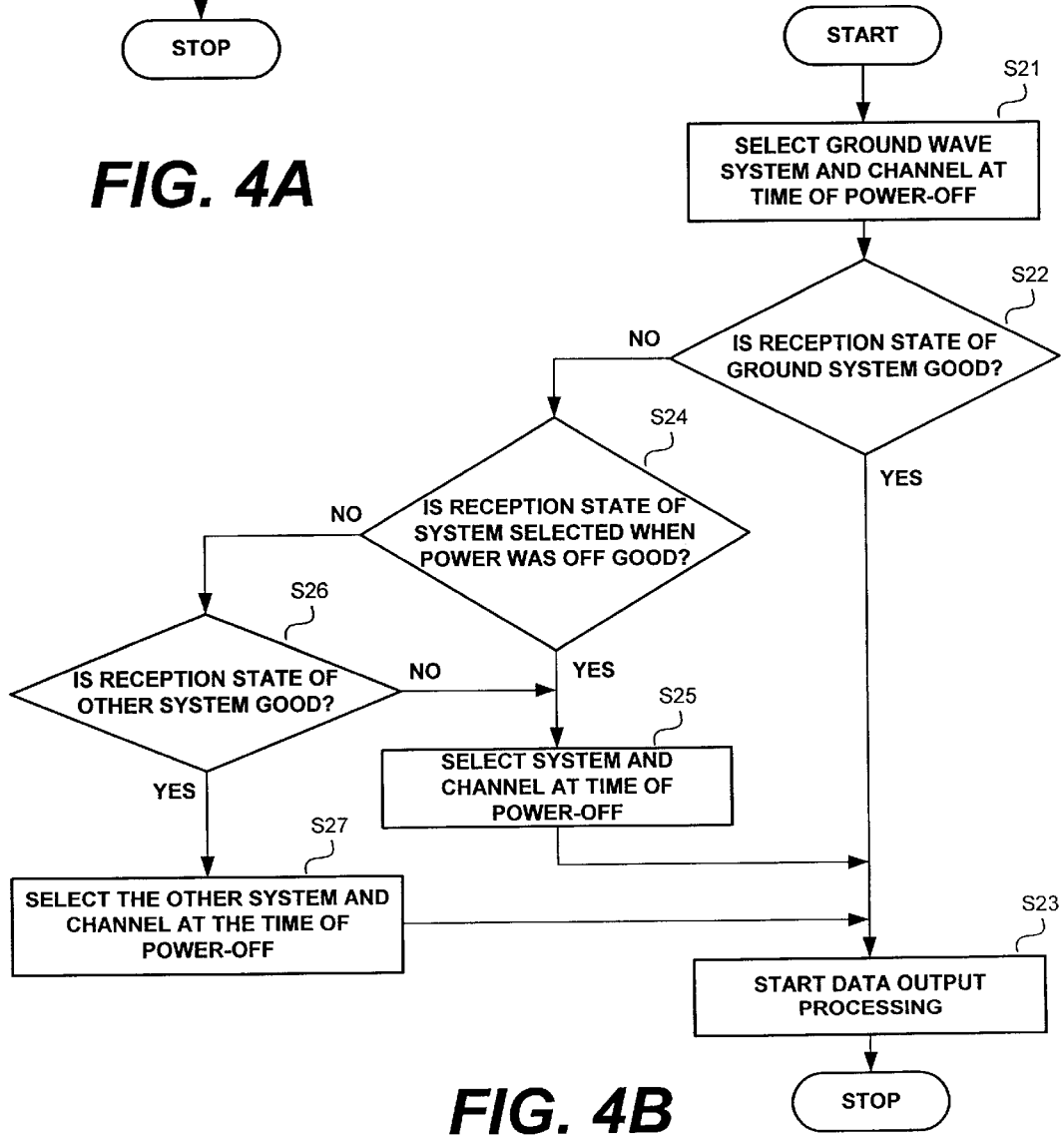
FIGS. 4A and 4B are flowcharts showing processes of a first exemplary operational mode of the receiver of FIG. 3.

In the first operation mode, when the receiver is powered on, a digital broadcast using a ground wave, for example, is selected and reproduced as long as the reception state of the digital broadcast supplied by the ground wave is not problematic. When the receiver is powered off in the first mode, the subroutine shown in FIG. 4A is executed. This subroutine corresponds to an operation that is performed by the system control circuit 319 in powering off the receiver. At step S11, the system control circuit 319 stores in the non-volatile RAM information indicating the system of a digital broadcast wave being decoded and output as well as its channel being output. At step S12, the system control circuit 319 powers off the receiver.

Next, a first operation mode process that is executed when the receiver is powered on again will be described with reference to a subroutine shown in FIG. 4B.

When the receiver is powered on again, all the circuits of the apparatus shown in FIG. 3 start to operate. In this exemplary embodiment, since the number of reception systems is the same as the number of transmission waves, the corresponding relationship between the reception systems and the transmission waves can always be fixed. However, where the number of transmission waves is greater than the number of reception systems, the reception systems may receive, for example, transmission waves of respective transmission systems that were selected when the receiver was powered off.

In the re-powering-on process, digital broadcast waves sent from the digital broadcasting stations are received by the antenna 310 and then converted into signals of a pre-scribed intermediate frequency by the high-frequency circuit 311. The reception signals are then demodulated into digital data by the respective demodulation circuits 313a–313c. Demodulated signals that are output from the demodulation circuits 313a–313c are supplied to respective de-interleave circuits 314a–314c and 315a–315b to rearrange the interleaved data sequences. In this manner, the respective reception data sequences of the digital broadcast waves are restored to the bit arrangements before the interleaving and transmission.

The error correction circuits 316a–316c perform error correction on the reception data for the respective reception systems. The error-corrected data sequences are then supplied to the selector 317. The error correction circuits 316a–316c also detect error rates of the respective data sequences and supply detected results to the system control circuit 319.

Referring to the subroutine of FIG. 4B, at step S21 the system control circuit 319 selects the digital broadcast wave from the ground wave station and sets the receiver channel to one that was selected when the power was turned off. Specifically, the system control circuit 319 supplies the selector 317 with a control signal that causes the selector 317 to select the reception data of the ground wave system, i.e., data that is output from the error correction circuit 316c.

At step S22, the system control circuit 319 judges a reception state of the digital broadcast wave of the ground wave system. Specifically, the judgement made by system control circuit 319 is based on the detection result of the reception level detection circuit 312 and the data error rate that is supplied from the error correction circuit 316c.

If the reception state of the digital broadcast wave of the ground system is judged good, at step S23 the system control circuit 319 outputs to the decoder 318 an instruction to decode the reception information of the digital broadcast wave of the selected ground wave system. As a result, a reproduction signal from the selected ground wave on the channel that was stored in the nonvolatile RAM when the power was turned off is output to output circuitry (not shown) downstream from the decoder 318.

In the exemplary embodiment shown in FIG. 3, the ground wave system including circuits 313c, 314c and 316c does not have a de-interleave circuit for de-interleaving a data sequence of several frames. Thus, the ground wave system does not include de-interleaving circuitry requiring an increase in processing time. In the ground wave system, the maximum amount of interleaving that is performed on transmission data is limited to one frame of the transmission format. This is based on an assumption that the reception electric field of a digital broadcast wave from the ground wave station is stronger than that of a digital broadcast wave from each of the satellite systems. Under this assumption, a burst error would be less prone to occur in a ground wave than in one of the satellite waves.

The individual reception circuits start to operate after the receiver is powered on. After a lapse of at most one-frame period (generally several hundreds of milliseconds), it becomes possible to reproduce the reception information that is sent from the digital broadcasting ground station and output resulting video and/or audio.

On the other hand, for digital broadcast waves transmitted from satellite broadcast wave stations in this exemplary embodiment, it is assumed that the amount of interleaving that is performed on transmission data reaches several frames. Therefore, it is necessary for the receiver to store subject reception data of several frames in order to de-interleave reception data. This means that when the receiver is powered on, a period corresponding to several frames (generally several seconds) is needed to reproduce and output reception information (e.g., video and/or audio) of a digital broadcast wave of each satellite broadcast wave system.

Therefore, when the receiver starts to receive broadcast waves of the three systems at the same time, it can obtain evaluation parameters (a data error rate etc.) of the ground wave system earlier than those of the satellite wave systems. For this reason in this exemplary embodiment, a broadcast wave of the ground wave system is evaluated first.

If at step S22 the reception state of the digital broadcast wave of the ground system is not judged as being good, then at step S24 the system control circuit 19 judges the reception state of the digital broadcast wave of the reception system that had been selected for information output at the time when power was turned off. At the time of power-off, information pertaining to which system was selected for reproduction that had been stored in the nonvolatile RAM during step S11 in the power-off subroutine is accessed (checked). The reason for checking the reception state of the digital broadcast wave stored in the RAM is that, in the case that the receiver is a vehicular receiver, the probability is high that the geographical location of the vehicle (i.e., the receiver) at the time of power-off of the receiver is the same as at the time of re-powering-on.

As described above, switching is made in the receiver among the reception systems so that the reception state of the reception system that is selected for information output is always good, at least relatively among the received waves. Therefore, it is inferred that the digital broadcast that had been viewed at the same location until the power was turned off provides the best reception state. The reception state of a digital broadcast wave is judged based on a detection result of the signal level detection circuit 312 and a data error rate that is supplied from the corresponding error correction circuit 316a or 316b, and is done for both received ground wave or satellite wave(s).

If the reception state of the digital broadcast wave of the reception system that had been selected for information output until the power was turned off is good, at step S25 the system control circuit 319 supplies the selector 317 with an instruction to select data from this system. At this time, the system control circuit 319 supplies the selector 317 with an instruction to select the reception information of the reproduction system at the step S25. The system control circuit 319 also supplies the decoder 318 with an instruction to start processing and outputting the selected reception information of the reproduction system and channel that were stored in the nonvolatile RAM at the step S11 in FIG. 4A. As a result, output processing of information output is started at step S23.

On the other hand, if the reception state of the digital broadcast wave of the reception system that had been selected for information output until the power was turned off is judged not good at step S24, at step S26 the system control circuit 319 judges the reception state of the digital broadcast wave of the system for which the reception state has not yet been evaluated. If the reception state of the digital broadcast wave of this system is judged good, at step S27 of the re-powering-on process the system control circuit 319 instructs the selector 317 to select the digital broadcast wave of the system having a good reception state in the same manner as described above. At this time, the system control circuit 319 supplies the decoder 318 with an instruction to start processing and outputting the reception selected information of the reproduction channel that was stored in the nonvolatile RAM at the step S11 in FIG. 4A at step S27. As a result, reception information output (reproduction) processing is started at step S23.

If it is judged at the step S26 that the reception state of the digital broadcast wave of the system for which the reception state has not been evaluated yet until the present time is not good, the system control circuit 319 proceeds to step S25. The fact that the reception state is judged not good at step S26 means that the receiver cannot establish a good reception condition for any of the digital broadcast waves transmitted by the ground or satellite systems that can be received by the receiver. In such a case, the digital broadcast wave and the reproduction (output) charmer that were selected when the power was turned off are selected and reception information output processing is started at step S23. This is based on an inference that the digital broadcast wave of the system whose condition of broadcast wave actually experienced (i.e., reproduced and viewed and/or heard) by the user until the power was turned off is the most stable of the plurality of broadcasted waves.

As described above, the first operation mode makes it possible to reproduce and output video and/or audio of a digital broadcast program in the shortest period from the point of power-on. This is realized by preferentially selecting the digital broadcast wave of the wave station having the smallest amount of interleaving when the receiver is powered on, which in the present exemplary embodiment is the ground wave station.

Next, the second operation mode of the receiver will be described. In the second operation mode, as in the case of the first operation mode, the digital broadcast wave of the ground wave system is selected at the time of power-on. However, after a lapse of a prescribed period of time from the power-on, the reception state of the digital broadcast wave of the system that was selected when the power was turned off is checked. If the reception state is judged good, this digital broadcast band is selected and its de-interleaved and decoded data is output from the receiver.

In the second operation mode, the same process as in the first operation mode is executed when the receiver is powered off. Specifically, as shown in a flowchart of FIG. 5A, at step S31, the system control circuit 319 stores in the nonvolatile RAM information indicating the system of a digital broadcast wave currently selected and output as well as information indicating its channel. At step S32, the system control circuit 319 powers off the receiver.

Figures 5A, 5B:
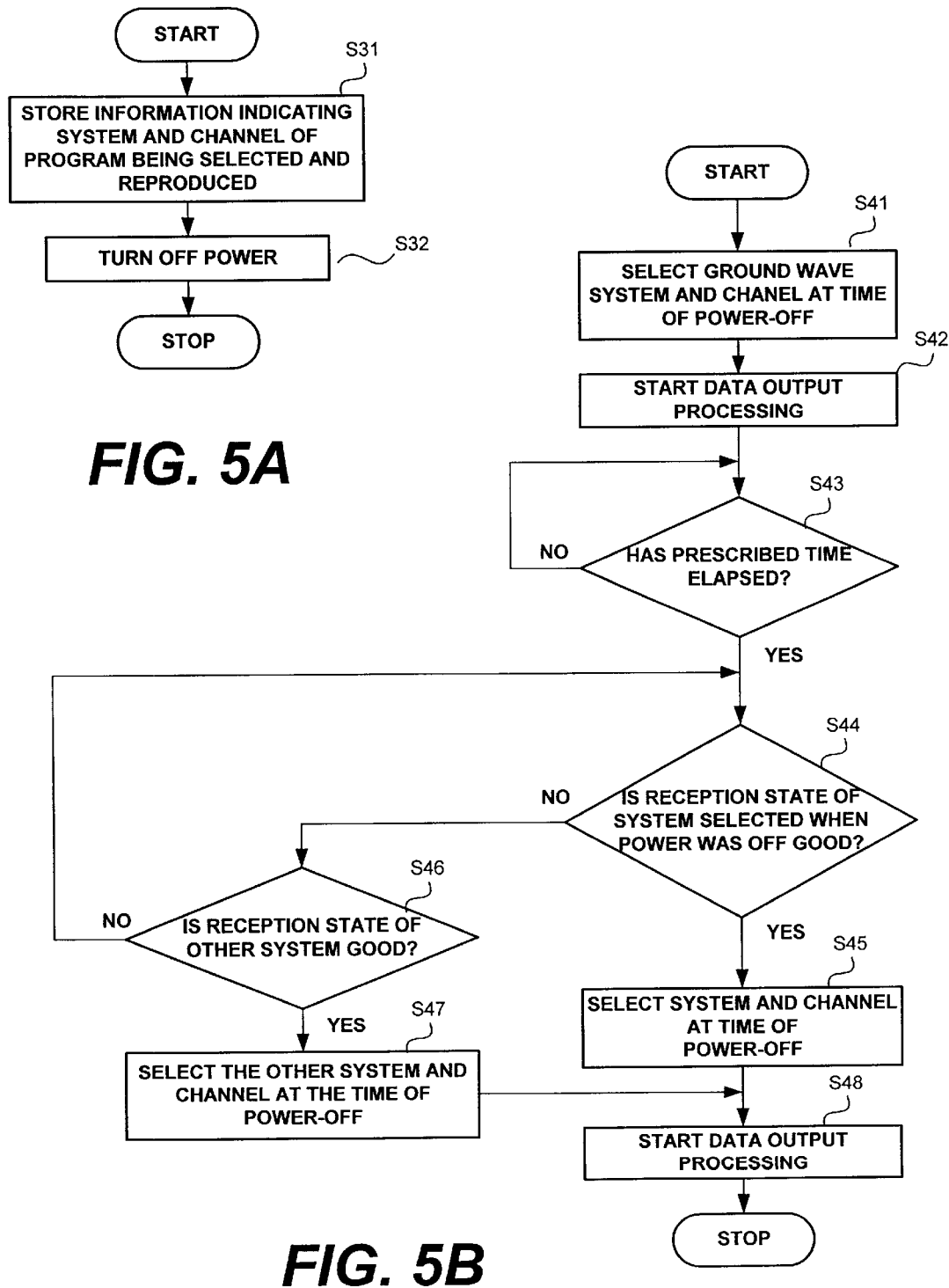
FIGS. 5A and 5B are flowcharts showing processes of a second exemplary operational mode of the receiver of FIG. 3.

When the receiver is powered on again, a subroutine as shown in FIG. 5B is executed. First, at step S41, the system control circuit 319 selects the digital broadcast wave of the ground wave system and sets the channel for outputting to the one that was selected when the power was turned off. At step S42, information of the selected channel is decoded and output.

Specifically, the system control circuit 319 supplies the selector 317 with a control signal for causing the selector 317 to select the reception data of the ground wave system. The system control circuit 319 supplies to the decoder 318 an instruction to process reception information corresponding to the channel number that was stored in the nonvolatile RAM at step S31 when the power was turned off.

After execution of the step S42, the system control circuit 319 judges at step S43 whether the prescribed period time has elapsed. If it is judged that the prescribed time has elapsed, the system control circuit 319 uses the information that was stored at the power-off. Specifically, at step S44 the system control circuit 319 checks a reception state of the reception system information that was stored in the nonvolatile RAM at the step S31.

The reason for the prescribed delay at the step S43 is that de-interleaving takes several seconds if the reception system that was selected when the power was turned off is a satellite broadcast system. The prescribed time is set so as to conform to a de-interleaving time necessary for systems that de-interleave more than one frame of data. As in the case of the first operation mode, the reception state judgment is based on detection results of the reception level detection circuit 312 and the error correction circuit 316.

If the reception state of the reception system that was selected when the power was turned off is judged good at the step S44, then at step S45 the system control circuit 319 selects the digital broadcast wave of this system in the place of the reception system selected at step S41. At this time, the system control circuit 319 selects the channel that was selected when the power was turned off and stored in the nonvolatile RAM at the step S31. As a result, reception information output processing is started at step S48.

On the other hand, if the reception state is judged not good at step S44, then at step S46 the system control circuit 319 judges the reception state of the system for which the reception state has not yet been evaluated. If the reception state of this system is judged good, then at step S47 the system control circuit 319 selects this system. At this time, the system control circuit 319 selects the channel that was selected when the power was turned off and that was stored in the nonvolatile RAM at step S31. As a result, reception information output processing is started at step S48.

In this exemplary embodiment, it is assumed that one ground broadcast wave and two satellite broadcast waves are received. Therefore, the ground wave system is excluded from being subjected to a check at step S46. This is because at steps S41 and S42, the digital broadcast wave of the ground wave system was selected and output of the reception information of this system was started, i.e., at the time of execution of step S46, the receiver is already outputting the information of the ground broadcast wave.

If it is judged at the step S46 that the reception state of the digital broadcast wave of the reception system other than the reception system that was selected when the power was turned off is not good, then the system control circuit 319 returns to the step S44. Subsequently, the system control circuit 319 checks the reception state of the reception system that was selected when the power was turned off and then checks the reception state of the other reception system.

The system control circuit 319 repeats the above operation, which makes it possible to select a reception system other than the ground wave system, if one of the other systems is in a good reception state. Until such point of time, reception information received by the ground wave reception system is output from the receiver as video and/or audio. Since the ground wave system has already been selected (e.g., at steps S41 and S42), problems such as non-selection of a broadcast system do not occur in the receiver.

In the second operation mode, when the receiver is powered on, the receiver selects preferentially the digital broadcast wave of a system having a smallest amount of interleaving. In this example, such a system is the ground wave system. This procedure is the same as in the first operation mode. This makes it possible to output reception information such as video and/or audio of a digital broadcast in a short period of time.

However, in contrast to the first operation mode, in the second operation mode the receiver switches to the digital broadcast wave of the reception system that was selected when the power was turned off after a lapse of the prescribed period of time as long as the prescribed condition is satisfied. The prescribed period of time corresponds to the time that is necessary for the de-interleaving of the satellite broadcast systems.

In the second operation mode, the system control circuit 319 finally gives priority to the reception system that was selected when the power was turned off. This is because, as described above with respect to the first operation mode, it is inferred that the reception state of the digital broadcast that had been experienced until the power was turned off is the best of the plurality of broadcasted waves.

The receiver may be configured so as to operate in either one of the first operation mode and the second operation mode, or both the first and second operation modes selectively. For example, it is possible to provide a control panel (not shown) that is connected to the system control circuit 319 and provide a switch or a ten-key in the control panel for selecting one of the first operation mode and the second operation mode. A user can arbitrarily select an operation mode using such an interface.

In the above example, the individual reception systems start to operate in parallel upon application of power irrespective of the operation mode. While the ground wave system is selected first, various kinds of processing, such as various levels of de-interleaving and/or error-correction, for example, are performed in all the broadcast wave systems. These parallel operations are effective in preventing a user from noticing a waiting time that relates to a de-interleaving process.

In the foregoing embodiment, the receiver has the three reception systems and always performs reception processing of every system. However, it is not necessary for the receiver to always perform processing of every system. If it is important to reduce the power consumption of the receiver, one possible exemplary method for reducing power is to suspend the reception processing of each of the reception systems other than the selected reception system once the reception system is determined at step S23 or S48. In this case, one or a plurality of reception systems whose reception condition is good may be kept active, and monitoring of the reception conditions may be continued only for those systems.

The above embodiments are directed to operations that are performed when the receiver is powered on or off. However, the invention may be implemented in other ways. For example, the invention can be used in switching the reception radio wave between a digital broadcast wave and an ordinary FM broadcast wave that does not have interleaving, or in switching between a digital broadcast receiver and another source such as a compact disc reproducing apparatus. In short, the invention can be used in any situation where reception of a digital broadcast wave starts or ends.

It will be apparent to those skilled in the art that various modifications and variations can be made to the receiver for digital broadcasting of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

In the claims:

1. A receiver for digital broadcasting comprising:
   RF circuitry configured to simultaneously receive a plurality of digital broadcasting waves, wherein each digital broadcasting wave carries a data structure including the same program content, but arranged in a different interleaving manner with respect to one another;
   a plurality of demodulators configured to demodulate the plurality of digital broadcasting waves;
   a plurality of de-interleave circuits, each of the plurality of de-interleave circuits configured to rearrange data sequences that are output from a respective one of the plurality of demodulators;
   a selector coupled with the plurality of interleave circuits and selecting one of the rearranged data sequences that are output from the plurality of de-interleave circuits; and
   a controller that determines an order of selection by the selector, wherein one of the plurality of digital broadcastings waves requiring a relatively shorter time period for de-interleaving its respective data sequence is first selected when the receiver starts a receiving activity.

2. The receiver according to claim 1, wherein the digital broadcasting wave requiring a relatively shorter time period for de-interleaving its data sequence is a digital broadcasting wave requiring the shortest time period for de-interleaving among the plurality of digital broadcasting waves.

3. The receiver according to claim 1, wherein the controller monitors a reception condition of the digital broadcasting wave requiring a relatively shorter time period for de-interleaving its data sequence, and another one of the plurality of digital broadcasting waves is selected next in the order of selection when the monitored reception condition becomes weak relative the another one of the plurality of digital broadcasting waves.

4. The receiver according to claim 3, further comprising a memory for storing data relating to which digital broadcasting wave is selected by the selector at the time when the receiving activity ends, wherein the another one of the plurality of digital broadcasting waves is designated as the next selected one in the order of selection according to the data stored in the memory when the receiver re-starts the receiving activity.

5. The receiver according to claim 4, further comprising a decoder to decode a signal that is output from the selector.

6. The receiver according to claim 5, wherein the digital broadcasting wave requiring a relatively shorter time period for de-interleaving its data sequence and the another one of the plurality of digital broadcasting waves are associated with one channel of a plurality of channels selectable on the receiver.

7. The receiver according to claim 6, wherein the controller designates one of the plurality of channels and the decoder outputs a signal corresponding to the one channel of the plurality of channels selectable on the receiver.

8. The receiver according to claim 7, wherein the memory further stores data relating to which channel of the plurality of channels selectable on the receiver is output from the decoder at the time when the receiving activity ends, and the channel stored in the memory is the designated one of the plurality of channels selectable on the receiver when the receiver re-starts the receiving activity.

9. The receiver according to claim 8, wherein the designated one of the plurality of channels selectable on the receiver is maintained even when the another one of plurality of digital broadcasting waves is selected.

10. The receiver according to claim 1, wherein the controller monitors a receiving condition of another one of the plurality of digital broadcasting waves, and the another one of the plurality of digital broadcasting waves is next selected when the receiving condition exceeds a predetermined level or is relatively better than the digital broadcasting wave requiring a relatively shorter time period for de-interleaving its data sequence.

11. The receiver according to claim 10, further comprising a memory for storing data relating to which digital broadcasting wave is selected by the selector at the time when the receiving activity ends, wherein the another one of the plurality of digital broadcasting waves is designated as the next selected one in the order of selection according to the data stored in the memory when the receiver re-starts the receiving activity.

12. The receiver according to claim 11, further comprising a decoder for decoding an output signal from the selector.

13. The receiver according to claim 12, wherein the digital broadcasting wave requiring a relatively shorter time period for de-interleaving its data sequence and the another one of the plurality of digital broadcasting waves are associated with one channel of a plurality of channels selectable on the receiver.

14. The receiver according to claim 13, wherein the controller designates the one of the plurality of channels selectable on the receiver, and the decoder outputs a signal corresponding to the one channel of the plurality of channels selectable on the receiver.

15. The receiver according to claim 14, wherein the memory further stores data relating to the one channel of the plurality of channels selectable on the receiver that is output from the decoder at the time when the receiving activity ends, and the one channel of the plurality of channels selectable on the receiver is designated as the reproduction channel according to the data stored in the memory when the receiver re-starts the receiving activity.

16. The receiver according to claim 15, wherein the designated one of the plurality of channels selectable on the receiver is maintained even when the another one of plurality of digital broadcasting waves is selected.

17. A receiver for digital broadcasting comprising:
   RF circuit means for simultaneously receiving a plurality of digital broadcasting waves, each of the digital broadcasting waves including a data structure differing from each other in a interleaving manner, but including a same program content for reproduction;
   demodulation means for demodulating the plurality of digital broadcasting waves and outputting respective data sequences associated with the digital broadcasting waves;
   de-interleave means for rearranging the respective data sequences output from the demodulation means and outputting a rearranged digital signal;

selector means for selecting one of the rearranged digital signals output from de-interleave means; and control means for determining an order of selection by the selector means, wherein one of the plurality of digital broadcasting waves requiring a relatively shorter time period for de-interleaving is determined as the first in the order of selection when the receiver starts a receiving activity.

18. The receiver according to claim 17, wherein the digital broadcasting wave requiring a relatively shorter time period for de-interleaving requires the shortest time period for de-interleaving among the plurality of digital broadcasting waves.

19. The receiver according to claim 17, wherein the control means further includes means for monitoring a receiving condition of the digital broadcasting wave requiring a relatively shorter time period for de-interleaving, wherein another one of the plurality of digital broadcasting waves is determined as second in the order of selection by the selector means and the another one of the digital broadcast waves is selected when the receiving condition of the first selected digital broadcasting wave becomes weak relative the another one of the plurality of digital broadcasting waves.

20. The receiver according to claim 19, further comprising memory means for storing data relating to which digital broadcasting wave is selected by the selector means at the time when the receiving activity ends; wherein the another one of the plurality of digital broadcasting waves is designated as the second one in the order of the selector according to the data stored in the memory means when the receiver re-starts the receiving activity.

21. The receiver according to claim 20, further comprising decode means for decoding an output signal from the selector means.

22. The receiver according to claim 21, wherein the digital broadcasting wave including a relatively shorter time period for de-interleaving and the another one of the plurality of digital broadcasting waves are associated with one channel of a plurality of channels receivable by the receiver.

23. The receiver according to claim 22, wherein the control means designates the one channel of the plurality of channels, and the decode means outputs a signal with regard to the one channel of the plurality of channels selectable on the receiver.

24. The receiver according to claim 23, wherein the memory means is further for storing data relating to which channel is output from the decode means at the time when the receiving activity ends, and the one channel of the plurality of channels selectable on the receiver is designated by the control means in accordance with the data stored in the memory means when the receiver re-starts the receiving activity.

25. The receiver according to claim 24, wherein the one channel of the plurality of channels selectable on the receiver is maintained even after the another one of plurality of digital broadcasting waves is second in the order of selection by the selector means and is selected for reproduction.

26. The receiver according to claim 17, wherein the control means includes means for monitoring a receiving condition of another one of the plurality of digital broadcasting waves, and the another one of the plurality of digital broadcasting waves is selected as second in the order of selection by the selector means when the receiving condition of the another one of the plurality of digital broadcasting waves is judged by the control means as being well.

27. The receiver according to claim 26, further comprising memory means for storing data relating to which digital broadcasting wave of the plurality of digital broadcast waves is selected by the select means at the time when the receiving activity ends, wherein the another one of the plurality of digital broadcasting waves is designated as the second one in the order of selection according to the data stored in the memory means when the receiver re-starts the receiving activity.

28. The receiver according to claim 27, further comprising decode means for decoding an output signal from the selector means.

29. The receiver according to claim 28, wherein the digital broadcasting wave including a relatively shorter time period for de-interleaving and the another one of the plurality of digital broadcasting waves include a plurality of channels selectable on the receiver.

30. The receiver according to claim 29, wherein the control means designates the one channel of the plurality of channels selectable on the receiver, and the decode means outputs a signal with regard to the one channel of the plurality of channels.

31. The receiver according to claim 30, wherein the memory means is further for storing data relating to which channel of the plurality of channels selectable on the receiver is output from the decode means at the time when the receiving activity ends, and the one channel of the plurality of channels is selected according to the data stored in the memory means when the receiver re-starts the receiving activity.

32. The receiver according to claim 31, wherein the one channel of the plurality of channels selectable on the receiver is maintained even after the another one of plurality of digital broadcasting waves is second selected.

33. A method of receiving digital broadcasting, comprising the steps of:

simultaneously receiving a plurality of digital broadcasting waves, wherein each of the waves includes a data structure that has been interleaved in a manner different for each wave, and the data structure of each wave includes a same program;

demodulating the plurality of digital broadcasting waves;

de-interleaving, respectively, each data sequence of the demodulated waves to produce a plurality of de-interleaved data sequences, each sequence corresponding to one of the plurality of broadcasting waves; and selecting for reproduction one of de-interleaved data sequences, wherein when the receiver starts a receiving activity, an order of selecting is such that a digital broadcasting wave of the plurality of digital broadcasting waves requiring a relatively shorter time period for completion of the de-interleaving step than another of the plurality of digital broadcast waves is first selected.

34. The method according to claim 33, wherein the digital broadcasting wave requiring a relatively shorter time period for de-interleaving is one of the digital broadcasting waves requiring the shortest time period for de-interleaving.

35. The method according to claim 33, further comprising the steps of:

monitoring a reception condition of the first selected digital broadcasting wave requiring a relatively shorter time period for de-interleaving: and selecting another one of the plurality of digital broadcasting waves as the second one in the order of selection when the monitored reception condition becomes weak relative to the another one of the plurality of digital broadcasting waves.

36. The method according to claim 35, further comprising the steps of:
storing in a memory first data relating to which digital broadcasting wave is selected when the receiving activity ends; and
designating the another one of the plurality of digital broadcasting waves as the second one in the order of selection according to the first data when the receiver re-starts the receiving activity.

37. The method according to claim 36, further comprising the step of decoding the de-interleaved data sequence of the selected digital broadcasting wave.

38. The method according to claim 37, wherein the digital broadcasting wave requiring a relatively shorter time period for de-interleaving and the another one of the plurality of digital broadcasting waves are reproduced on one of a plurality of channels selectable on the receiver.

39. The method according to claim 38, further comprising the step of selecting one of the plurality of channels selectable on the receiver and outputting a signal on the selected one of the plurality of channels that results from the decoding step.

40. The method according to claim 39, further comprising the step of storing second data into the memory relating to which channel is output at the step of the decoding when the receiving activity ends, wherein the one of the plurality of channels is selected according to the second data stored when the receiver re-starts the receiving activity.

41. The method according to claim 40, wherein the selected one of the plurality of channels selectable on the receiver is maintained even when the another one of plurality of digital broadcasting waves is selected.

42. The method according to claim 33, further comprising the steps of:
monitoring a receiving condition of other ones of the plurality of digital broadcasting waves not selected when the receiver starts a receiving activity,
selecting the other ones of the plurality of digital broadcasting waves when the receiving condition of one of the other ones is well.

43. The method according to claim 42, further comprising the steps of:
storing into a memory first data relating to which digital broadcasting wave is selected when the receiving activity ends;
designating the one of the other ones of the plurality of digital broadcasting waves as the second one in the order of selection according to the first data when the receiver re-starts the receiving activity.

44. The method according to claim 43, further comprising the step of decoding the de-interleaved data sequence of the selected digital broadcasting wave.

45. The method according to claim 44, wherein the digital broadcasting wave requiring a relatively shorter time period for de-interleaving and the other ones of the plurality of digital broadcasting waves are reproduced on one of a plurality of channels selectable on the receiver.

46. The method according to claim 45, further comprising the step of selecting one of the plurality of channels selectable on the receiver and outputting a signal on the selected one of the plurality of channels that results from the decoding step.

47. The method according to claim 46, further comprising the step of storing into the memory second data relating to which channel is output at the step of the decoding step when the receiving activity ends, wherein the selected one of the plurality of channels is selected according to the second data when the receiver re-starts the receiving activity.

48. The method according to claim 47, wherein the selected one of the plurality of channels selectable on the receiver is maintained after selection is made of any other one of plurality of digital broadcasting waves.

* * * * *